United States Patent
Chen et al.

(10) Patent No.: US 11,506,957 B2
(45) Date of Patent: Nov. 22, 2022

(54) OPTICAL MODULE AND PROJECTION APPARATUS

(71) Applicant: Coretronic Corporation, Hsin-Chu (TW)

(72) Inventors: Wei-Hao Chen, Hsin-Chu (TW); Jing-Si Chen, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 17/164,775

(22) Filed: Feb. 1, 2021

(65) Prior Publication Data
US 2021/0240061 A1 Aug. 5, 2021

(30) Foreign Application Priority Data
Feb. 5, 2020 (CN) .......................... 202010080309.1

(51) Int. Cl.
| | | |
|---|---|---|
| G03B 21/14 | (2006.01) | |
| G02B 7/00 | (2021.01) | |
| G02B 27/09 | (2006.01) | |
| G03B 21/00 | (2006.01) | |

(52) U.S. Cl.
CPC ............. *G03B 21/14* (2013.01); *G02B 7/005* (2013.01); *G02B 27/0927* (2013.01); *G03B 21/005* (2013.01)

(58) Field of Classification Search
CPC .. G03B 21/14; G03B 21/005; G02B 27/0927; G02B 7/005
See application file for complete search history.

(56) References Cited

U.S. PATENT DOCUMENTS

| | | | |
|---|---|---|---|
| 2005/0264501 A1* | 12/2005 | Choi ..................... | G09G 3/007 345/84 |
| 2012/0033280 A1* | 2/2012 | Mizoguchi .......... | G02B 26/085 359/198.1 |
| 2016/0227176 A1* | 8/2016 | Mizoguchi .......... | G03B 21/142 |
| 2016/0370575 A1* | 12/2016 | Lin ...................... | G02B 26/085 |
| 2017/0299883 A1* | 10/2017 | Nonaka ............... | G03B 21/142 |
| 2019/0196308 A1* | 6/2019 | Chang ................. | G02B 26/085 |
| 2020/0004123 A1* | 1/2020 | Chang ................. | G03B 21/145 |
| 2020/0174350 A1* | 6/2020 | Chang ................. | G03B 21/142 |
| 2020/0278593 A1* | 9/2020 | Lin ...................... | G03B 21/005 |
| 2021/0026230 A1* | 1/2021 | Liu ..................... | G03B 21/2033 |
| 2021/0200071 A1* | 7/2021 | Chang ................. | G03B 21/145 |

FOREIGN PATENT DOCUMENTS

| | | | | |
|---|---|---|---|---|
| CN | 209746337 U | * | 12/2019 | ............. G03B 21/14 |
| TW | 201928428 | | 7/2019 | |

* cited by examiner

*Primary Examiner* — Magda Cruz
(74) *Attorney, Agent, or Firm* — JCIPRNET

(57) ABSTRACT

The invention provides an optical module and a projection apparatus. The optical module includes a base, a first frame, an optical element, and at least one first driving assembly. The first frame is disposed in the base and includes a first body and a pair of first shaft portions, the first shaft portion extending outward from the first body, and the first body including a pair of first inner folded edges. The optical element is disposed between the pair of first inner folded edges. The first driving assembly and the optical element abut against two opposite sides of one of the first inner folded edges, respectively, and the first driving assembly is configured to drive the first body to swing relative to the base by taking the first shaft portion as a rotating shaft.

18 Claims, 5 Drawing Sheets

OPTICAL MODULE AND PROJECTION APPARATUS

CROSS-REFERENCE TO RELATED APPLICATION

This application claims the priority benefit of China application serial no. 202010080309.1, filed on Feb. 5, 2020. The entirety of the above-mentioned patent application is hereby incorporated by reference herein and made a part of this specification.

BACKGROUND

Technical Field

The disclosure relates to an optical module and a projection apparatus, and in particular, to an optical module which may adjust a deflection angle of an optical element and a projection apparatus using the optical module.

Description of Related Art

Volume is an important indicator in designing an optical module. An optical module with a small volume can save space of an optical device. In addition, a larger volume corresponds to a larger moment of inertia, and therefore a larger thrust force is required to reach a target swing speed, and a larger volume produces a larger noise when operating. Therefore, the optical module is designed to reduce a volume thereof as much as possible.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention were acknowledged by a person of ordinary skill in the art.

SUMMARY

The invention provides an optical module with a small volume.

The invention provides a projection apparatus which may effectively reduce noise emitted during operation.

Other objectives and advantages of the invention may be further known from technical features disclosed in the invention.

In order to achieve one or a part or all of the foregoing objectives, or other objectives, an embodiment of the invention provides an optical module including a base, a first frame, an optical element, and at least one first driving assembly. The first frame is disposed in the base. The first frame includes a first body and a pair of first shaft portions, the first shaft portion extending outward from the first body, and the first body including a pair of first inner folded edges. The optical element is disposed between the pair of first inner folded edges. The first driving assembly and the optical element abut against two opposite sides of one of the first inner folded edges, respectively, and the first driving assembly is configured to drive the first body to swing relative to the base by taking the first shaft portion as a rotating shaft.

In order to achieve one or a part or all of the foregoing objectives, or other objectives, an embodiment of the invention further provides a projection apparatus including an illumination system, a light valve, the foregoing optical module, and a projection lens. The illumination system is configured to provide an illumination beam; the light valve is located on a transmission path of the illumination beam, and is configured to convert the illumination beam into an image beam; the optical module is located on a transmission path of the image beam and is configured to increase a resolution of the image beam; and the projection lens is located on the transmission path of the image beam and is configured to project the image beam, the optical module being disposed between the light valve and the projection lens.

Based on the foregoing, embodiments of the invention are characterized with at least one of the following advantages or effects. In the optical module and the projection apparatus according to the embodiments of the invention, the driving assembly and the optical element abut against two opposite sides of the inner folded edge of the frame, respectively, so that the driving assembly may be closer to the optical element. In this way, an overall size of the optical module may be effectively reduced, and a vibration sound generated during operation of the projection apparatus may be reduced.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
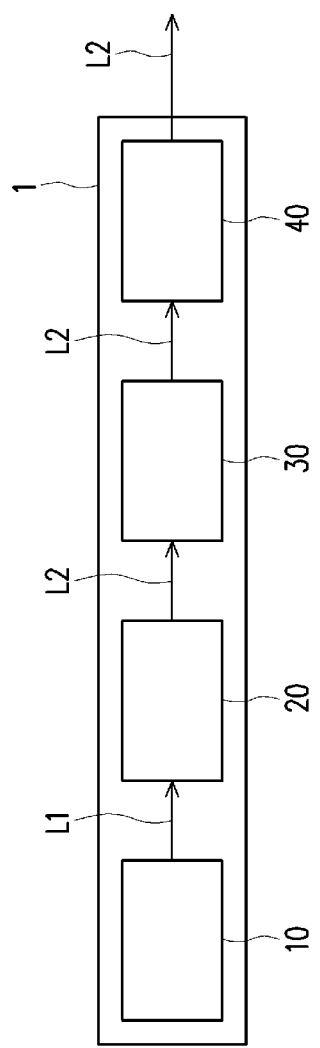
FIG. 1 is a schematic diagram of a projection apparatus of the invention.
Figure 2A:
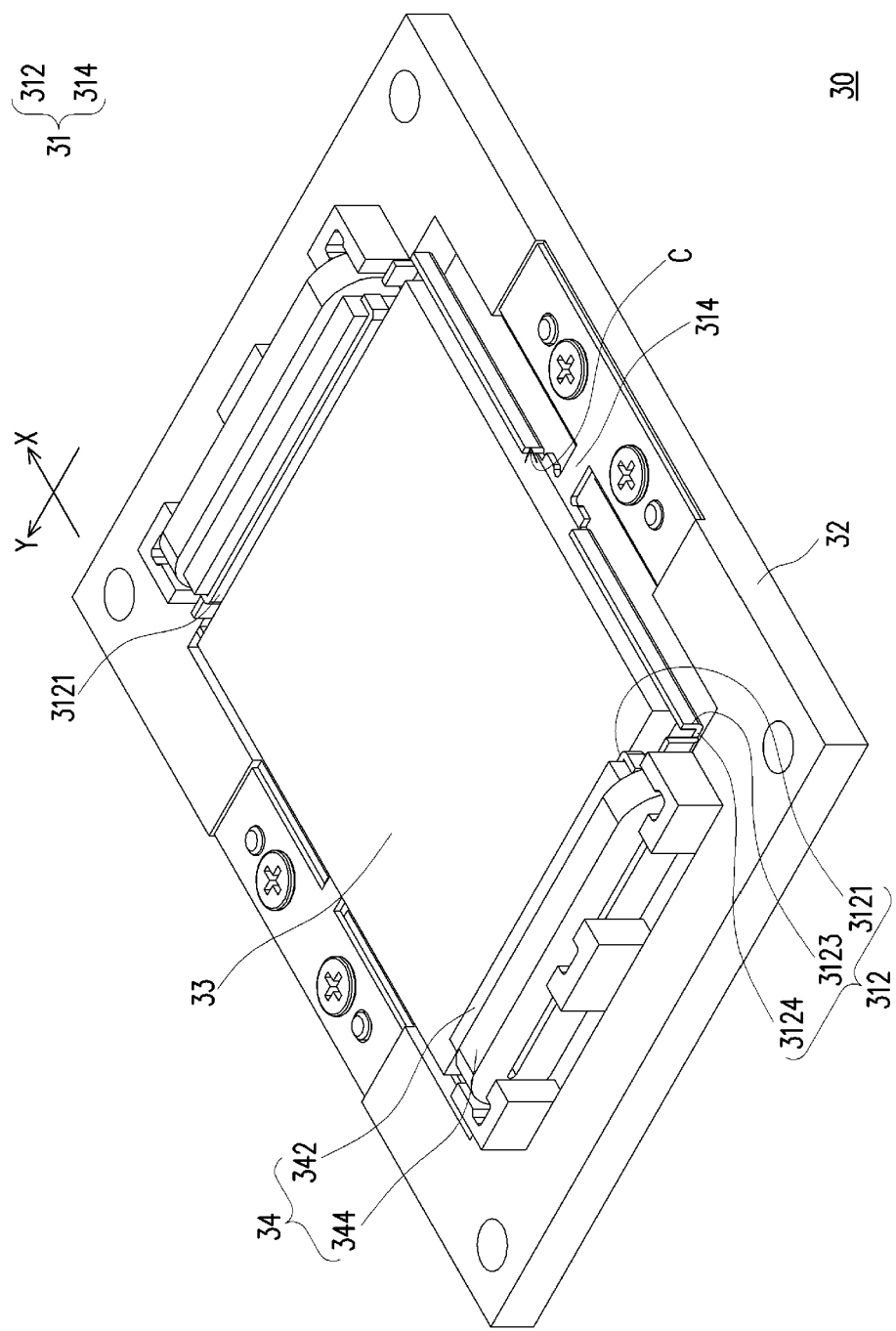
FIG. 2A is a schematic diagram of an optical module in FIG. 1.
Figure 2B:
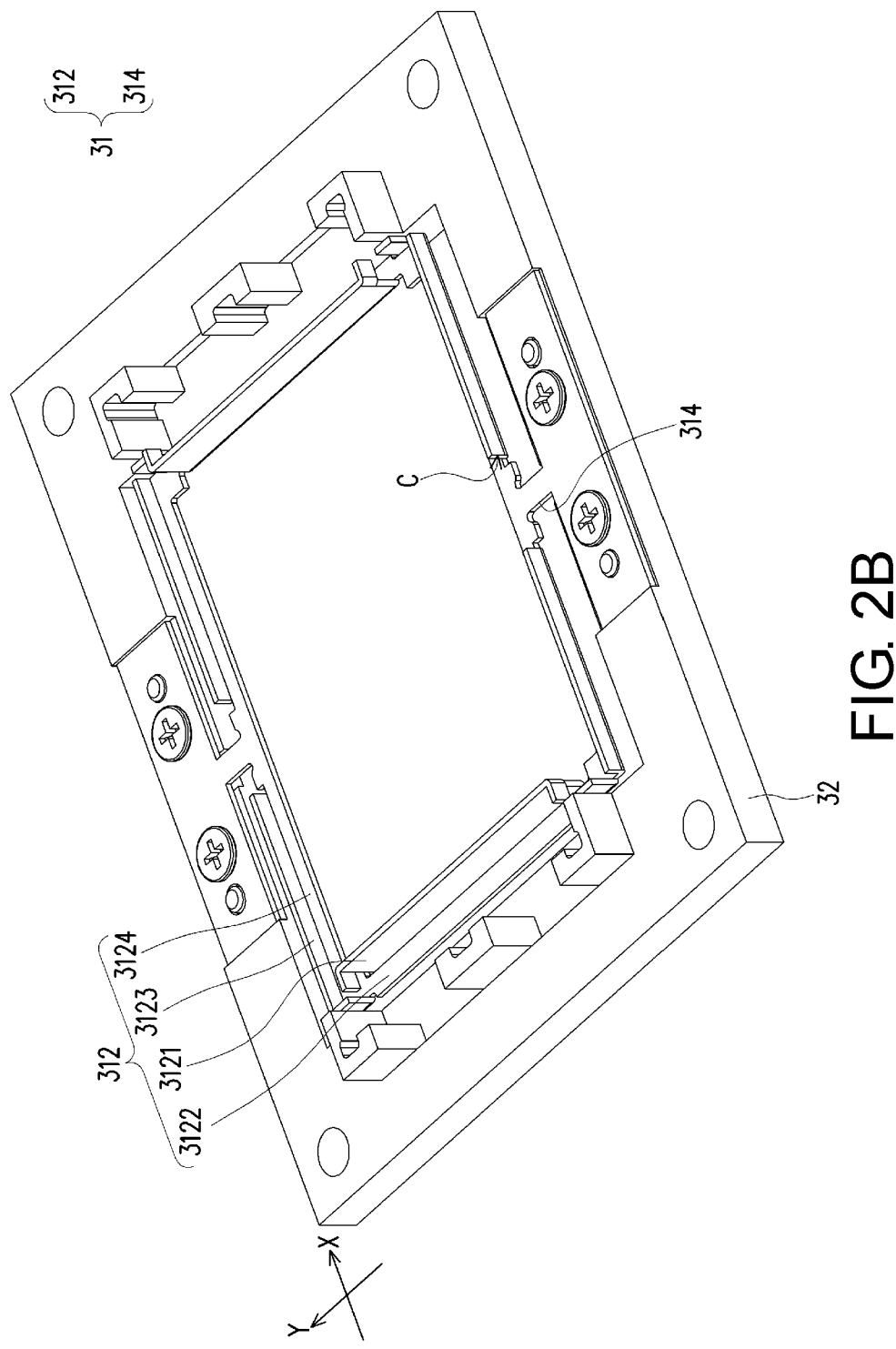
FIG. 2B is a schematic diagram of a frame and a base of FIG. 2A.

FIG. 1 is a schematic diagram of a projection apparatus of the invention, FIG. 2A is a schematic diagram of an optical module in FIG. 1, and FIG. 2B is a schematic diagram of a frame and a base of FIG. 2A. Referring to FIG. 1, FIG. 2A, and FIG. 2B together, a projection apparatus 1 includes an illumination system 10, a light valve 20, an optical module 30, and a projection lens 40. The illumination system 10 is configured to provide an illumination beam L1. The light valve 20 is located on a transmission path of the illumination beam L1 and is configured to convert the illumination beam L1 into an image beam L2. The optical module 30 is located on a transmission path of the image beam L2 and is configured to increase a resolution of the image beam L2. The projection lens 40 is located on the transmission path of the image beam L2 and is configured to project the image beam L2. The optical module 30 is disposed between the light valve 20 and the projection lens 40.

The optical module 30 includes a base 32, a first frame 31, an optical element 33, and at least one first driving assembly 34. FIG. 2A shows two first driving assemblies 34. The first frame 31 may be formed by a metal plate through stamping, cutting, and bending. The first frame 31 is disposed in the base 32, and the first frame 31 includes a first body 312 and a pair of first shaft portions 314. The first shaft portions 314 extend outward from the first body 312. In the present embodiment, for example, the first shaft portion 314 extends from two opposite sides of the first body 312 to the base 32 to be connected to the base 32, but the invention is not limited thereto. The first body 312 includes a pair of first inner folded edges 3121. The inner folded edges refer to edges that are at opposite inner sides of a board and that are formed through folding from edges of an inner side of the board toward a relatively outer side. The inner side refers to a side that is relatively away from the base 32, and the outer side refers to a side that is relatively close to the base 32. The first body 312 further includes a first inner horizontal portion 3122 that is substantially perpendicularly connected to the first inner folded edge 3121.

The optical element 33 is disposed between the pair of first inner folded edges 3121. In particular, the optical element 33 is framed in an inner region (not labelled) surrounded by the first body 312, and the first inner folded edge 3121 are located on two opposite sides of the optical element 33.

The first driving assembly 34 for driving the first body 312 to swing relative to the base 32 by taking the first shaft portion 314 as a rotating shaft and the optical element 33 abut against on two opposite sides of the first inner folded edge 3121, respectively. More particular, the first driving assembly 34 is placed on the first inner horizontal portion 3122 of the first body 312 and abuts against an outer side of a corresponding first inner folded edge 3121, and the optical element 33 abuts against an inner side of a corresponding first inner folded edge 3121. In the present embodiment, there are two first driving assemblies 34. Therefore, the two first driving assemblies 34 are placed on the first inner horizontal portion 3122 located on two opposite sides of the first body 312, and abut against the corresponding first inner folded edges 3121, respectively.

In other implementations, there may also be only one first driving assembly 34. Therefore, the first driving assembly 34 is disposed in a manner of abutting against one of the two first inner folded edges 3121.

The first body 312 further includes a pair of first outer folded edges 3123. The first inner folded edges 3121 are located on two opposite sides of the first body 312, and the first outer folded edges 3123 are located on the other two opposite sides of the first body 312. In other words, the first inner folded edges 3121 and the first outer folded edges 3123 substantially and collectively form a square. The outer folded edges herein refer to edges that are at a relatively outer side of a board and that are formed through folding from an edge of the outer side of the board toward an inner side. The inner side refers to a side that is relatively away from the base 32, and the outer side refers to a side that is relatively close to the base 32. A junction at which the first body 312 and the first outer folded edge 3123 are substantially perpendicularly connected is defined as the first outer horizontal portion 3124. The optical element 33 is placed on the first outer horizontal portion 3124 of the first body 312 and abuts against the first outer folded edge 3123 and the first inner folded edge 3121. In particular, the first inner folded edge 3121 is located between the first inner horizontal portion 3122 and the optical element 33, and therefore the optical element 33 abuts against the first inner folded edge 3121. The first outer horizontal portion 3124 is located between the two first outer folded edges 3123, and therefore the optical element 33 is placed on the first outer horizontal portion 3124 and abuts against the first outer folded edge 3123.

Referring to both FIG. 2A and FIG. 2B, through folding, the first driving assembly 34 and the optical element 33 may commonly sandwich the first inner folded edge 3121, so that the first driving assembly is placed to be closer to the optical element 33. Therefore, a board width can be reduced in a first direction X, and a size of the first frame 31 is effectively reduced.

In addition, because the first driving assembly 34 in the present embodiment is directly placed on the first inner horizontal portion 3122 and abuts against the first inner folded edge 3121, stability of the first driving assembly 34 may be improved.

In addition, because the optical element 33 abuts against the first outer folded edge 3123, the board width may be further reduced on a side edge, that is, a second direction Y, that is of the first body 312 and that is not provided with the first driving assembly 34. Therefore, an overall size of the first frame 31 may be effectively reduced.

Incidentally, a side face of the first driving assembly 34 faces the abutted first inner folded edge 3121, an area in which the side face of the first driving assembly 34 overlaps with the first inner folded edge 3121 against which the first driving assembly 34 abuts is greater than or equal to 50% of an area of the side face of the first driving assembly 34.

Further, the first driving assembly 34 includes, for example, a magnet 342 and a coil 344. The magnet 342 and the coil 344 face each other, and there is a gap between the magnet 342 and the coil 344. In the present embodiment, the magnet 342 abuts against an outer side of the first inner folded edge 3121, and the coil 344 is disposed on the base. However, in other embodiments, positions of the magnet 342 and the coil 344 may be exchanged with each other. For example, the coil 344 may abut against the outer side of the first folded edge 3121, and the magnet 342 is disposed on the base, and the invention is not limited thereto. In addition, because the first frame 31 is made of a magnetic conductivity material (metal), through such a design, when the optical module 30 operates, the first driving assembly 34 is supplied with power to form an electromagnetic effect, and the first inner folded edge 3121 may be used as a yoke to increase magnetic lines of force, so that a force for the first driving assembly 34 to drive the optical element 33 is stronger.

Still referring to FIG. 2A and FIG. 2B, the first outer folded edge 3123 may include a disconnected portion C. A first shaft portion 314 is correspondingly disposed at the disconnected portion C. The first shaft portion 314 is parallel to the first outer horizontal portion 3124 and extends toward the base 32 so as to be connected to the base 32.

In the foregoing embodiment, the first frame 31 of the optical module 30 is formed in a single shaft, and the first shaft portion 314 extends outward from a pair of side edges of the first body 312 toward a direction of two opposite sides.

Figure 3:
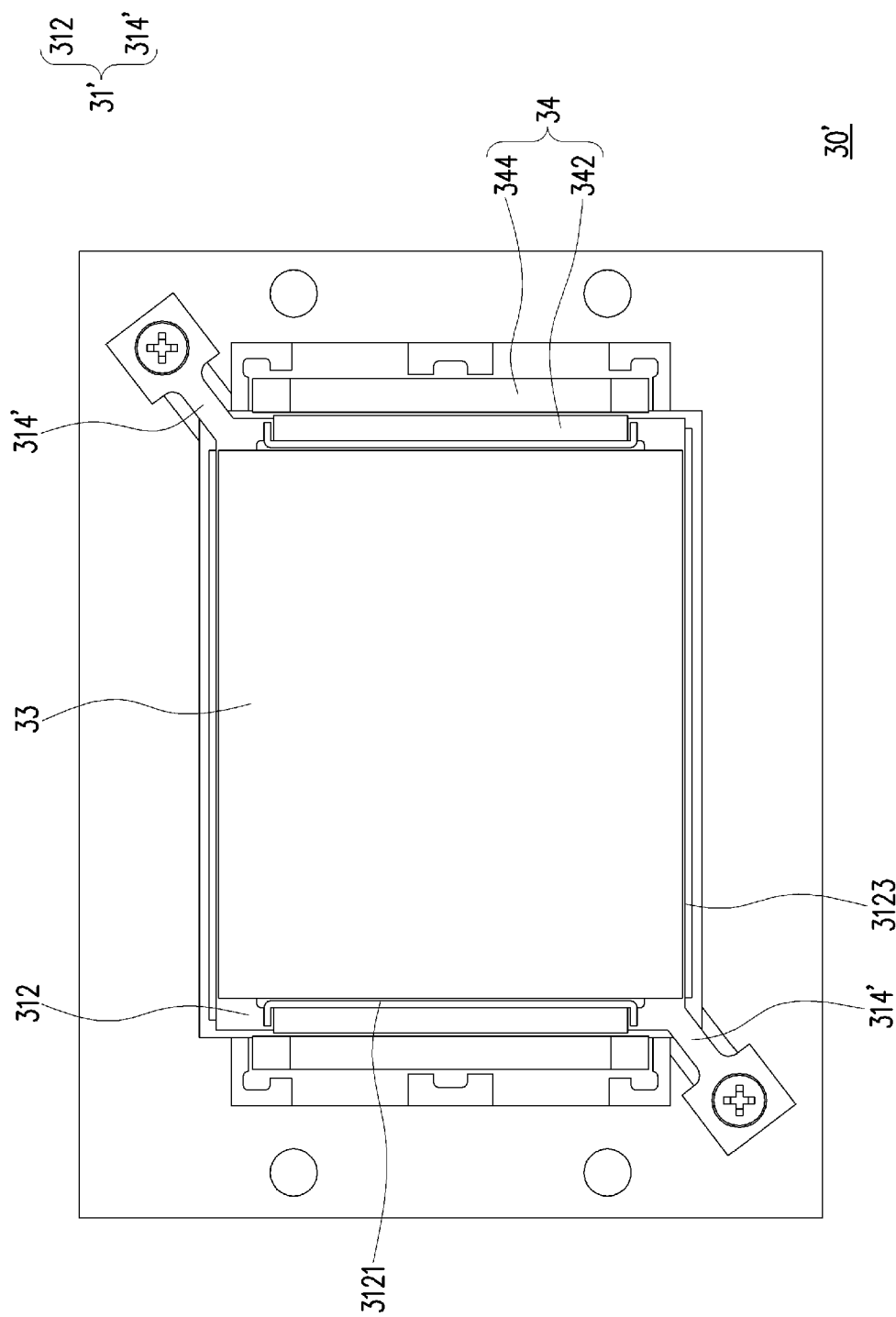
FIG. 3 is a schematic diagram of an optical module according to another embodiment.

FIG. 3 is a schematic diagram of an optical module according to another embodiment. Referring to FIG. 3, a difference between the present embodiment and the foregoing embodiments is that: In an optical module 30', a first shaft portion 314' of a first frame 31' extends outward from a diagonal line of a first body 312.

In particular, the first shaft portion 314' is formed at a junction of two side edges of the first body 312. A first inner folded edge 3121 is formed on one of the two side edges, and a first outer folded edge 3123 is formed on the other side edge.

In a case where the first shaft portion 314' is formed at a diagonal line of the first body 312, the first inner folded edge 3121 or the first outer folded edge 3123 may be continuous and uninterrupted without a disconnected portion C. In a case where there is no disconnecting portion C, a contact area in which the first driving assembly 34 abuts against the first inner folded edge 3121 is larger, and therefore the first driving assembly 34 can be stably disposed on the first frame 31'. Definitely, overall weight of the first frame 31' may be reduced as required, so that the first inner folded edge 3121 or the first outer folded edge 3123 includes a disconnected portion C.

Figure 4:
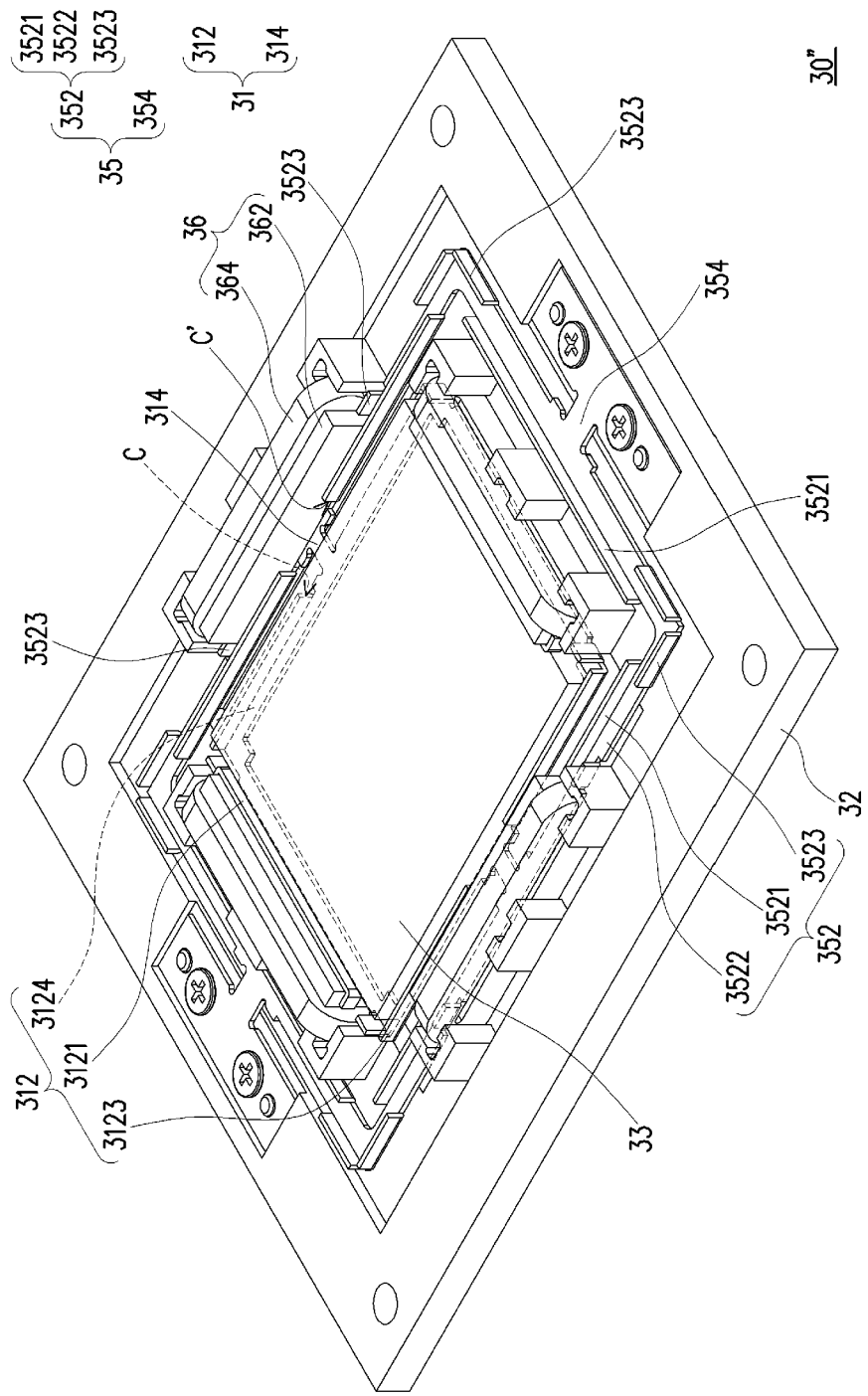
FIG. 4 is a schematic diagram of an optical module according to another embodiment of the invention.

FIG. 4 is a schematic diagram of an optical module according to another embodiment of the invention. Referring to FIG. 4, in the present embodiment, an optical module 30" is similar to the optical module 30 except that the optical module 30" further includes a second frame 35 disposed between the first frame 31 and the base 32. The second frame 35 includes a second body 352 and a pair of second shaft portions 354. The first shaft portion 314 is connected to the second body 352. The second shaft portion 354 extends outward from two opposite sides of the second body 352 and is connected to the base 32. A direction in which the first shaft portion 314 extends is perpendicular to a direction in which the second shaft portion 354 extends.

The second body 352 may include a pair of second inner folded edges 3521, a plurality of second outer folded edges 3523, and a second inner horizontal portion 3522 connected to the second inner folded edges 3521. Because definitions of the inner folded edges and outer folded edges are illustrated in the foregoing, and the descriptions thereof are omitted herein.

The optical module 30" further includes at least one second driving assembly 36 disposed on one side of one that is of a pair of second inner folded edges 3521 and that is oriented toward the base 32. FIG. 4 shows two second driving assemblies 36 respectively disposed on a pair of second inner folded edges 3521. The second driving assemblies 36 are configured to drive the second body 352 to swing relative to the base 32 by taking a second shaft portion 354 as a rotating shaft. A part of the second driving assembly 36 is sandwiched between two second outer folded edges 3523 of the plurality of second outer folded edges 3523 to position the second driving assembly 36. Further, the second driving assembly 36 includes, for example, a magnet 362 and a coil 364. The magnet 362 and the coil 364 face each other, and there is a gap between the magnet 362 and the coil 364. In the present embodiment, the magnet 362 abuts against an outer side of the second inner folded edge 3521 and is sandwiched between the two second outer folded edges 3523. The coil 364 is disposed on the base. However, in other embodiments, positions of the magnet 362 and the coil 364 may be exchanged with each other. For example, the coil 364 may abut against an outer side of the second inner folded edge 3521 and be sandwiched between the two second outer folded edges 3523, and the magnet 362 is disposed on the base, and the invention is not limited thereto.

In other implementations, there may also be only one second driving assembly 36. Therefore, the second driving assembly 36 is disposed in a manner of abutting against one of the two second inner folded edges 3521.

In the present embodiment, the first frame 31 and the second frame 35 may be made of a metal plate. The first outer folded edge 3123 may include a disconnected portion C, and a first shaft portion 314 of the first frame 31 extends from the disconnected portion C of the outer folded edge 3123 to be directly connected to the second body 352 of the second frame 35. Alternatively, when the first frame 31 and the second frame 35 are connected together by post-processing, the disconnected portion C of the first outer folded edge 3123 may extend out of the first shaft portion 314 toward the second frame 35 so as to be connected to the second body 352 of the second frame 35. In addition, as shown in FIG. 4, the second inner folded edge 3521 may include a disconnected portion C', and the first shaft portion 314 of the first frame 31 extends from the disconnected portion C of the first outer folded edge 3123 to the disconnected portion C' of the second inner folded edge 3521.

In another implementation, the first outer folded edge 3123 and the second outer folded edge 3523 may be continuous and uninterrupted folded edges. The first frame 31 and the second frame 35 may be connected together by post-processing. For example, the first frame 31 is connected to the second frame 35 using an iron sheet by welding or locking between the first frame 31 and the second frame 35.

In addition, returning to FIG. 4, a plurality of second outer folded edges 3523 included in the second body 352 may also be distributed on a side edge on which the second driving assembly 36 is not disposed, to strengthen structural strength of the second body 352. What's more, in an embodiment in FIG. 4, a plurality of other second inner folded edges 3521 are further included and may also be distributed on the side edge on which the second driving assembly 36 is not disposed, to strengthen the structural strength of the second body 352.

Based on the foregoing, in the optical module and the projection apparatus applying the optical module of the invention, through change of a disposing manner of the folded edge, the first driving assembly is disposed to be closer to the optical element. Therefore, sizes of the frame and the base of the optical module may be effectively reduced, so that an overall size of the optical module is more compact. In particular, 7% and 5% of space may be saved for the frame in the width direction (for example, the first direction X shown in FIG. 2A and FIG. 2B) and the length direction (for example, the second direction Y shown in FIG. 2A and FIG. 2B).

In addition, the overall size of the frame is effectively reduced, so that a moment of inertia may be reduced by 14%. Therefore, when the optical module is operating, a thrust force provided to the optical module may be reduced by 5% to reach the same swing speed, and a vibration sound during operation of the projection apparatus may be reduced.

What's more, because the side face of the first driving assembly directly abuts against the first inner folded edge, and the area in which the side face of the first driving assembly overlaps with the first inner folded edge against which the first driving assembly abuts is greater than or equal to 50% of the area of the side face of the first driving assembly, so that the first folded edge may be used as a yoke, thereby increasing magnetic lines of force, and causing a force for the first driving assembly to drive the optical element to be stronger.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Moreover, these claims may refer to use "first", "second", etc. following with noun or element. Such terms should be understood as a nomenclature and should not be construed as giving the limitation on the number of the elements modified by such nomenclature unless specific number has been given. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. An optical module comprising: a base, a first frame, an optical element, and at least one first driving assembly, wherein
    the first frame is disposed in the base, and the first frame comprises a first body and a pair of first shaft portions, wherein the pair of first shaft portions extend outward from the first body, and the first body comprises a pair of first inner folded edges and a first inner horizontal portion connected to the pair of first inner folded edges;
    the optical element is disposed between the pair of first inner folded edges; and
    the at least one first driving assembly and the optical element abut against two opposite sides of one of the pair of first inner folded edges, respectively, the at least one first driving assembly is placed on the first inner horizontal portion, and the at least one first driving assembly is configured to drive the first body to swing relative to the base by taking the pair of first shaft portions as a rotating shaft.

2. The optical module according to claim 1, wherein the first body further comprises a pair of first outer folded edges, wherein the first inner folded edges are located on two opposite sides of the first body, the first outer folded edges are located on other two opposite sides of the first body, and the optical element abuts against the pair of first outer folded edges and the pair of first inner folded edges.

3. The optical module according to claim 2, wherein the first outer folded edge is a continuous and uninterrupted folded edge.

4. The optical module according to claim 2, wherein the first outer folded edge comprises a disconnected portion.

5. The optical module according to claim 1, wherein a side face of the first driving assembly faces the abutted first inner folded edge, and an area in which the side face of the first driving assembly overlaps with the first inner folded edge against which the first driving assembly abuts is greater than or equal to 50% of an area of the side face of the first driving assembly.

6. The optical module according to claim 1, wherein the pair of first shaft portions extend outward from a diagonal line of the first body.

7. An optical module comprising: a base, a first frame, an optical element, at least one first driving assembly, and a second frame, wherein
    the first frame is disposed in the base, and the first frame comprises a first body and a pair of first shaft portions, wherein the pair of first shaft portions extend outward from the first body, and the first body comprises a pair of first inner folded edges;
    the optical element is disposed between the pair of first inner folded edges;
    the at least one first driving assembly and the optical element abut against two opposite sides of one of the pair of first inner folded edges, respectively, and the at least one first driving assembly is configured to drive the first body to swing relative to the base by taking the pair of first shaft portions as a rotating shaft; and the second frame disposed between the first frame and the base, wherein the second frame comprises a second body and a pair of second shaft portions, wherein the pair of first shaft portions are connected to the second body, the pair of second shaft portions extend outward from two opposite sides of the second body and are connected to the base, and a direction in which the pair of first shaft portions extend is perpendicular to a direction in which the pair of second shaft portions extend.

8. The optical module according to claim 7, further comprising at least one second driving assembly, wherein the second body further comprises a pair of second inner folded edges, the at least one second driving assembly is disposed on one side, which is oriented toward the base, of one of the pair of second inner folded edges, and the at least one second driving assembly is configured to drive the second body to swing relative to the base by taking the pair of second shaft portions as a rotating shaft.

9. The optical module according to claim 8, further comprising a plurality of second outer folded edges, wherein a part of the at least one second driving assembly is sandwiched between two second outer folded edges of the plurality of second outer folded edges.

10. A projection apparatus comprising an illumination system, a light valve, an optical module, and a projection lens, wherein
the illumination system is configured to provide an illumination beam,
the light valve is located on a transmission path of the illumination beam and is configured to convert the illumination beam into an image beam,
the optical module is located on a transmission path of the image beam and is configured to increase a resolution of the image beam, and the optical module comprises a base, a first frame, an optical element, and at least one first driving assembly, wherein
the first frame is disposed in the base, and the first frame comprises a first body and a pair of first shaft portions, wherein the pair of first shaft portions extend outward from the first body, and the first body comprises a pair of first inner folded edges and a first inner horizontal portion connected to the pair of first inner folded edges,
the optical element is disposed between the pair of first inner folded edges, and
the at least one first driving assembly and the optical element abut against two opposite sides of one of the pair of first inner folded edges, respectively, the at least one first driving assembly is placed on the first inner horizontal portion, and the at least one first driving assembly is configured to drive the first body to swing relative to the base by taking the pair of first shaft portions as a rotating shaft, and
the projection lens is located on the transmission path of the image beam and is configured to project the image beam, wherein the optical module is disposed between the light valve and the projection lens.

11. The projection apparatus according to claim 10, wherein the first body further comprises a pair of first outer folded edges, wherein the first inner folded edges are located on two opposite sides of the first body, the first outer folded edges are located on other two opposite sides of the first body, and the optical element abuts against the pair of first outer folded edges and the pair of first inner folded edges.

12. The projection apparatus according to claim 11, wherein the first outer folded edge is a continuous and uninterrupted folded edge.

13. The projection apparatus according to claim 11, wherein the first outer folded edge comprises a disconnected portion.

14. The projection apparatus according to claim 10, wherein a side face of the first driving assembly faces the abutted first inner folded edge, and an area in which the side face of the first driving assembly overlaps with the first inner folded edge against which the first driving assembly abuts is greater than or equal to 50% of an area of the side face of the first driving assembly.

15. The projection apparatus according to claim 10, wherein the pair of first shaft portions extend outward from a diagonal line of the first body.

16. A projection apparatus comprising an illumination system, a light valve, an optical module, and a projection lens, wherein
the illumination system is configured to provide an illumination beam,
the light valve is located on a transmission path of the illumination beam and is configured to convert the illumination beam into an image beam,
the optical module is located on a transmission path of the image beam and is configured to increase a resolution of the image beam, and the optical module comprises a base, a first frame, an optical element, at least one first driving assembly, and a second frame, wherein
the first frame is disposed in the base, and the first frame comprises a first body and a pair of first shaft portions, wherein the pair of first shaft portions extend outward from the first body, and the first body comprises a pair of first inner folded edges,
the optical element is disposed between the pair of first inner folded edges,
the at least one first driving assembly and the optical element abut against two opposite sides of one of the pair of first inner folded edges, respectively, and the at least one first driving assembly is configured to drive the first body to swing relative to the base by taking the pair of first shaft portions as a rotating shaft, and
the second frame disposed between the first frame and the base, wherein the second frame comprises a second body and a pair of second shaft portions, wherein the pair of first shaft portions are connected to the second body, the pair of second shaft portions extend outward from two opposite sides of the second body and are connected to the base, and a direction in which the pair of first shaft portions extend is perpendicular to a direction in which the pair of second shaft portions extend, and
the projection lens is located on the transmission path of the image beam and is configured to project the image beam, wherein the optical module is disposed between the light valve and the projection lens.

17. The projection apparatus according to claim 16, further comprising at least one second driving assembly, wherein the second body further comprises a pair of second inner folded edges, the at least one second driving assembly is disposed on one side, which is oriented toward the base, of one of the pair of second inner folded edges, and the at least one second driving assembly is configured to drive the second body to swing relative to the base by taking the pair of second shaft portions as a rotating shaft.

18. The projection apparatus according to claim 17, further comprising a plurality of second outer folded edges, wherein a part of the at least one second driving assembly is sandwiched between two second outer folded edges of the plurality of second outer folded edges.

\* \* \* \* \*